United States Patent
Nagar et al.

(10) Patent No.: US 11,714,963 B2
(45) Date of Patent: Aug. 1, 2023

(54) CONTENT MODIFICATION USING NATURAL LANGUAGE PROCESSING TO INCLUDE FEATURES OF INTEREST TO VARIOUS GROUPS

(71) Applicant: International Business Machines Corporation, Armonk, NY (US)

(72) Inventors: Seema Nagar, Bangalore (IN); Kuntal Dey, Vasant Kunj (IN); Nishtha Madaan, Hisar (IN); Manish Anand Bhide, Hyderabad (IN); Sameep Mehta, Bangalore (IN); Diptikalyan Saha, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 408 days.

(21) Appl. No.: 16/817,974

(22) Filed: Mar. 13, 2020

(65) Prior Publication Data

US 2021/0286945 A1    Sep. 16, 2021

(51) Int. Cl.
*G06F 40/279* (2020.01)
*G06N 20/00* (2019.01)
(Continued)

(52) U.S. Cl.
CPC .......... *G06F 40/279* (2020.01); *G06F 40/166* (2020.01); *G06N 20/00* (2019.01);
(Continued)

(58) Field of Classification Search
CPC ...... G06F 40/279; G06F 40/166; G06F 40/30; G06N 20/00; G06N 20/20; G06N 5/003;
(Continued)

(56) References Cited

U.S. PATENT DOCUMENTS 4,712,174 A    12/1987   Minkler, II
8,732,176 B2   5/2014    Chow et al.
(Continued)

OTHER PUBLICATIONS

J. Pennington, et al., "GloVe: Global Vectors for Word Representation", Proceedings of the 2014 Conference on Empirical Methods in Natural Language Processing (EMNLP), Oct. 25-29, 2014, Doha, Qatar, 12 pages.
(Continued)

*Primary Examiner* — Andrew R Dyer
(74) *Attorney, Agent, or Firm* — Edell, Shapiro & Finnan, LLC

(57) ABSTRACT

According to one embodiment of the present invention, a system for modifying content associated with an item comprises at least one processor. Features of interest of the item to a plurality of different groups are determined based on user comments produced by members of the plurality of different groups. The members within each group have a common characteristic. The features of interest to each group within the content associated with the item are identified, and the content associated with the item is modified by balancing the features of interest to the plurality of different groups within the content associated with the item. Embodiments of the present invention further include a method and computer program product for modifying content associated with an item in substantially the same manner described above.

20 Claims, 8 Drawing Sheets

(51) Int. Cl.
| | |
|---|---|
| G06Q 50/00 | (2012.01) |
| G06F 40/166 | (2020.01) |
| G06Q 30/0204 | (2023.01) |
| G06Q 10/087 | (2023.01) |
| G06Q 30/0601 | (2023.01) |
| G06Q 30/0202 | (2023.01) |

(52) U.S. Cl.
CPC ....... *G06Q 10/087* (2013.01); *G06Q 30/0202* (2013.01); *G06Q 30/0204* (2013.01); *G06Q 30/0623* (2013.01); *G06Q 50/01* (2013.01)

(58) Field of Classification Search
CPC ............ G06N 5/022; G06N 3/04; G06N 3/08; G06N 5/01; G06Q 10/087; G06Q 30/0202; G06Q 30/0204; G06Q 30/0623; G06Q 50/01
USPC .......................................................... 704/9
See application file for complete search history.

(56) References Cited

U.S. PATENT DOCUMENTS

| | | | | |
|---|---|---|---|---|
| 9,164,982 | B1 | 10/2015 | Kaeser | |
| 9,342,507 | B1 | 5/2016 | Kaeser | |
| 9,720,978 | B1* | 8/2017 | Peterson | G06F 16/93 |
| 10,242,260 | B1* | 3/2019 | Shen | G06N 20/10 |
| 10,467,339 | B1* | 11/2019 | Shen | G06F 40/247 |
| 2007/0015125 | A1* | 1/2007 | Mobbs | G09B 7/00 434/219 |
| 2012/0197816 | A1* | 8/2012 | Short | G06Q 30/0282 705/347 |
| 2015/0154251 | A1* | 6/2015 | Cockcroft | G06F 16/951 707/722 |
| 2015/0220995 | A1* | 8/2015 | Guyot | G06Q 30/0269 705/14.66 |
| 2015/0228033 | A1* | 8/2015 | Zenhausern | G06Q 30/00 705/319 |
| 2016/0253546 | A1* | 9/2016 | Bauchspies | G06V 40/1359 382/124 |
| 2017/0017971 | A1* | 1/2017 | Moreau | G06Q 30/0202 |
| 2017/0061300 | A1 | 3/2017 | Yahia et al. | |
| 2017/0124575 | A1* | 5/2017 | Clark | G06F 16/24578 |
| 2017/0206504 | A1 | 7/2017 | Taylor et al. | |
| 2017/0308944 | A1 | 10/2017 | Gilb | |
| 2018/0089629 | A1 | 3/2018 | Mather et al. | |
| 2019/0099653 | A1* | 4/2019 | Wanke | G06Q 30/0203 |
| 2019/0147371 | A1* | 5/2019 | Deo | G06N 20/20 706/12 |
| 2019/0171874 | A1 | 6/2019 | Shen et al. | |
| 2019/0279231 | A1* | 9/2019 | Ning | G06Q 30/0202 |
| 2019/0356969 | A1* | 11/2019 | Coughlin | H04N 21/8455 |
| 2020/0184278 | A1* | 6/2020 | Zadeh | G06K 9/6264 |
| 2020/0210695 | A1* | 7/2020 | Walters | G06F 40/279 |
| 2020/0226661 | A1* | 7/2020 | Lan | G06F 16/3334 |
| 2020/0242421 | A1* | 7/2020 | Sobhany | G06F 3/011 |
| 2020/0380309 | A1* | 12/2020 | Weider | G06F 9/44 |
| 2021/0150546 | A1* | 5/2021 | Zhu | G06Q 30/0282 |
| 2021/0150594 | A1* | 5/2021 | Zhu | G06Q 30/0282 |
| 2021/0266619 | A1* | 8/2021 | Punja | H04N 21/26603 |

OTHER PUBLICATIONS

S. Park, et al., "A Computational Framework for Media Bias Mitigation," ACM Transactions on Interactive Intelligent Systems (TiiS), vol. 2, No. 2, Article No. 8, (Jun. 2012), https://doi.org/10.1145/2209310.2209311, 32 pages.
A. Demarco, et al., "An Accurate and Robust Gender Identification Algorithm", INTERSPEECH 2011, Aug. 28-31, 2011, Florence, Italy, 4 pages.
L. Elisa Celis, et al., "Fair and Diverse DPP-based Data Summarization", arXiv:1802.04023v1 [cs.LG], Feb. 13, 2018, 25 pages.
A. Caliskan-Islam, et al., "Semantics derived automatically from language corpora necessarily contain human biases", arXiv preprint arXiv:1608.07187 (2016), Aug. 24, 2016, 14 pages.
Su Lin Blodgett, et al., "Racial Disparity in Natural Language Processing: A Case Study of Social Media African-American English", arXiv:1707.00061v1 [cs.CY], Jun. 30, 2017, 4 pages.
T. Bolukbasi, et al., "Man is to Computer Programmer as Woman is to Homemaker? Debiasing Word Embeddings", 30th Conference on Neural Information Processing Systems, (NIPS 2016), Barcelona, Spain, 9 pages.
J. Zhao, et al., "Men Also Like Shopping: Reducing Gender Bias Amplification using Corpus-level Constraints", arXiv:1707.09457v1 [cs AI], Jul. 29, 2017, 11 pages.
N. Garg, et al., "Word embeddings quantify 100 years of gender and ethnic stereotypes", Apr. 3, 2018, Proceedings of the National Academy of Sciences 115.16 (2018): E3635-E3644, 10 pages.
N. Cheng, et al., "Author gender identification from text", Digital Investigation 8.1 (2011): 77-88, 11 pages.
S. Auer, et al., "DBpedia: A Nucleus for a Web of Open Data", The semantic web, Springer, Berlin, Heidelberg, 2007, 722-735, 14 pages.
A. Suvarna, et al., "Handling Gender Biases in E-Commerce Product Specifications", Grace Hopper Celebration India, accepted Aug. 2019, presented Nov. 8, 2019, 5 pages.
F. Chierichetti, et al., "Fair Clustering Through Fairlets", 31st Conference on Neural Information Processing Systems (NIPS 2017), Long Beach, CA, USA, 2017, 9 pages.
S. Corbett-Davies, et al., "Algorithmic decision making and the cost of fairness", arXiv:1701.08230v4 [cs.CY], Jun. 10, 2017, KDD '17, Halifax, NS, Canada, 10 pages.
L. Dixon, et al., "Measuring and Mitigating Unintended Bias in Text Classification", Proceedings of AAAI/ACM Conference on AI, Ethics, and Society, Feb. 2-3, 2018, New Orleans, LA, USA (AIES'18), ACM, New York, NY, USA, 7 pages.
M. Feldman, et al., "Certifying and removing disparate impact", arXiv:1414.3756v3 [stat.ML], Jul. 16, 2015, 28 pages.
S. A. Friedler, et al., "On the (im)possibility if fairness", arXiv:1609.07236v1 [cs.CY], Sep. 23, 2016, 16 pages.
S. Hajian, et al., "Algorithmic Bias: From Discrimination Discovery to Fairness-aware Data Mining", KDD '16, Aug. 13-17, 2016, San Francisco, CA, USA, 2 pages.
B.T. Luong, et al., "k-NN as an Implementation of Situation Testing for Discrimination Discovery and Prevention", Technical Report: TR-11-04, Feb. 20, 2011, 10 pages.
T. Mikolov, et al., "Distributed Representations of Words and Phrases and their Compositionality", Advances in Neural Information Processing Systems 26 (NIPS 2013), Harrahs and Harveys, Lake Tahoe, Dec. 5-10, 2013, 9 pages.
D. Pedreschi, et al., "Discrimination-aware data mining", Technical Report: TR-07-19, Sep. 28, 2007, 24 pages.
F. Rangel, et al., "Use of Language and Author Profiling: Identification of Gender and Age", Natural Language Processing and Cognitive Science, 2013, 10 pages.
J. Wiebe, et al., "Creating Subjective and Objective Sentence Classifiers from Unannotated Texts", In Proceedings of the 6th International Conference on Computational Linguistics and Intelligent Text Processing (CICLing-05), Mexico City, Mexico, Feb. 13-19, 2005, 12 pages.
I. Žliobaité, "On the relation between accuracy and fairness in binary classification", arXiv.1505.05723v1 [cs.LG], May 21, 2015, The 2nd Workshop on Fairness, Accountability, and Transparency in Machine Learning, Lille, France, 5 pages.
I. Žliobaité, "Measuring discrimination in algorithmic decision making", Data Min Knowl Disc (2017) 31:1060-1089, DOI 10.1007/s10618-017-0506-1, Mar. 31, 2017, 30 pages.
M. Kantrowitz, "Name Corpus: List of Male, Female, and Pet names", https://www.cs.cmu.edu/Groups/AI/util/areas/nlp/corpora/names/0.html, Version 1.3, Mar. 29, 1994, 1 pages.
J. Brownlee, "What Are Word Embeddings for Text?", Oct. 11, 2017, In Deep Learning for Natural Language Processing, https://machinelearningmastery.com/what-are-word-embeddings/, 22 pages.
S. McLaren, "9 Ways AI Will Reshape Recruiting (and How You Can Prepare)", LinkedIn Talent Blog, Feb. 12, 2018, https://business.

(56) References Cited

OTHER PUBLICATIONS linkedln.com/talent-solutions/blog/future-of-recruiting/2018/9-ways-ai-will-reshape-recruiting-and-how-you-can-prepare, 13 pages.
R. Bharadwaj, "Applying AI to Legal Contracts—What's Possible Now", Emerj, Feb. 10, 2019, https://emerj.com/ai-podcast-interviews/applying-ai-legal-contracts-whats-possible-now/, 16 pages.
Atoosa Mohammad Rezaei, "Author Gender Identification from Text", http://i-rep.emu.edu.tr:8080/jspui/bitstream/11129/1845/1/RezaeiAtoosa.pdf, Jul. 2014, 81 pages.
N. Garg, et al., "Word embeddings quantify 100 years of gender and ethnic stereotypes", PNAS, vol. 115, No. 16, E3635-E3644, https//www.pnas.org/content/pnas/115/16/E3635.full.pdf, Mar. 12, 2018, 10 pages.
D. Pedreschi, et al., "Discrimination-aware Data Mining", KDD'08, Aug. 24-27, 2008, Las Vegas, Nevada, USA, 9 pages.

\* cited by examiner

CONTENT MODIFICATION USING NATURAL LANGUAGE PROCESSING TO INCLUDE FEATURES OF INTEREST TO VARIOUS GROUPS

STATEMENT REGARDING PRIOR DISCLOSURES BY THE INVENTOR OR A JOINT INVENTOR

The following disclosure(s) are submitted under 35 U.S.C. 102(b)(1)(A):

DISCLOSURE(S): "Handling Gender Biases in E-Commerce Product Specifications", Ashima Suvarna, Nishtha Madaan, Seema Nagar, Kuntal Dey, Sameep Mehta, Grace Hopper Celebration India, accepted August 2019, presented Nov. 8, 2019, 5 pages.

BACKGROUND

1. Technical Field

Present invention embodiments relate to natural language processing, and more specifically, to modifying content using natural language processing by incorporating features of interest to various groups.

2. Discussion of the Related Art

Ensuring content is of interest to various groups of individuals is important for almost any entity, including commercial entities, to ensure that various viewpoints are represented. For example, a portion of a merchandise description may be of greater interest to a group of individuals highly experienced with the same type of merchandise. This greater interest may be produced by including features of the merchandise in the merchandise description that align only with the highly experienced individuals. In this case, a favored group (e.g., the highly experienced individuals) tends to have a greater association with the merchandise description than a less-favored group (e.g., individuals with a relatively low level of experience with the same type of merchandise).

SUMMARY

According to one embodiment of the present invention, a system for modifying content associated with an item comprises at least one processor. Features of interest of the item to a plurality of different groups are determined based on user comments produced by members of the plurality of different groups. The members within each group have a common characteristic. The features of interest to each group within the content associated with the item are identified, and the content associated with the item is modified by balancing the features of interest to the plurality of different groups within the content associated with the item. Embodiments of the present invention further include a method and computer program product for modifying content associated with an item in substantially the same manner described above.

BRIEF DESCRIPTION OF THE DRAWINGS

Generally, like reference numerals in the various figures are utilized to designate like components.

DETAILED DESCRIPTION

Figure 1:
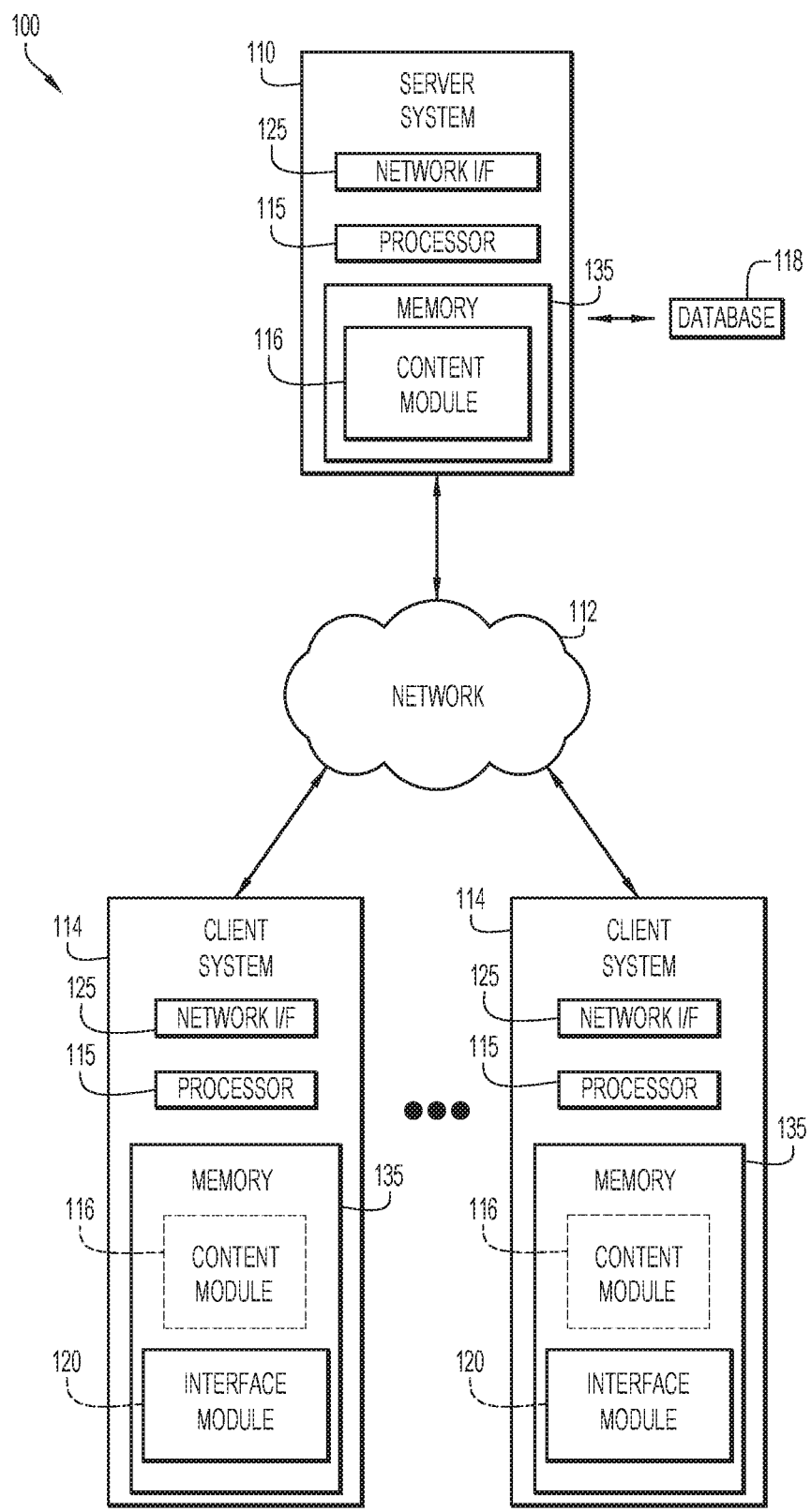
FIG. 1 is a diagrammatic illustration of an example computing environment according to an embodiment of the present invention.

Present invention embodiments determine that descriptive content for an item (e.g., product, service, announcement, opinion, etc.) is of greater interest to one or more of plural possible groups of individuals, and modify the descriptive content to be of interest to various different groups of individuals. The descriptive content may include any type of content (e.g., text, strings, any other types of content (e.g., image, etc.) where words are able to be extracted, etc.) describing any type of item (e.g., advertisement, description, announcement, opinion, review, etc.). Each group may include one or more individuals or members having at least one characteristic in common (e.g., experience with an item, frequency of use of the item, level of knowledge about the item or general area, etc.). For example, a first group may include experienced photographers as members, and a second group may include novice photographers as members. The experienced photographers may focus on features of interest for a camera including lens quality, shutter speed settings, and aperture settings (e.g., size of lens aperture opening, etc.), while novice photographers may focus on features of interest including ease-of-use for the camera. Descriptive content for the camera may include features pertaining to lens quality, shutter speed settings, and aperture settings, thereby being of greater interest to the experienced photographers of the first group. However, present invention embodiments may detect this situation, and modify the descriptive content to include features pertaining to ease-of-use to increase the interest to the novice photographers, thereby expanding the reach of the descriptive content to encompass the experienced and novice photographers of the first and second groups.

Present invention embodiments generate a modified version of descriptive content for an item (e.g., product, service, announcement, opinion, etc.). A presence and nature of a greater interest in the descriptive content for the item to one or more groups of individuals is detected. A compensating balance for the detected interest is selected using profiling and extraction of an interaction that individuals belonging to other groups performed with the item. The interaction is of a descriptive nature that integrates with the descriptive content.

Present invention embodiments may identify a greater interest to one or more groups of individuals in descriptive content for an item (e.g., product, service, announcement, opinion, etc.) using universal knowledge. Specific features of interest to different groups of individuals may be identified from user comments for the item. The user comments may include any type of feedback (e.g., remarks, reviews or ratings of the item, gestures indicating approval or disapproval, etc.) from any type of user (e.g., individual, critic, professional, expert, novice, etc.). The user comments may be retrieved from various data sources (e.g., documents or links from a client system, a database system or other storage unit, network site or page presenting the item description, social networking sites, review network sites, manufacturer network sites, retail network sites, etc.). Moreover, machine learning classifiers may be augmented from the user comments by extracting features of interest specific to different groups from user comments produced by members of the different groups. The augmented classifier may be used to identify the group associated with a producer of a user comment.

Present invention embodiments may balance features of interest from different groups of individuals within descriptive content for an item by generating and using a counter-balancing distribution with respect to observed interest to particular groups in the descriptive content. The generation of the counter-balancing distribution is performed by extracting objective (non-subjective) content portions of user comments for the item that contain features of interest to other groups desired to be addressed in the descriptive content. The group associated with a particular comment may be determined based on other user comments for the item produced by members of the different groups. Objective content generated by members of the groups to be addressed in the descriptive content is extracted to create a balanced description of the item. The descriptive content may be modified with the above-extracted counter-balancing feature distribution.

For example, a frequent visitor staying in a five star hotel may focus on features of interest including overall stay comfort and service quality, while an occasional visitor may focus on features of interest including the five star status and amenities. Specific features of interest to different groups of individuals may be identified from user comments for the item. The user comments may include any type of feedback (e.g., remarks, reviews or ratings of the item, gestures indicating approval or disapproval, etc.) from any type of user (e.g., individual, critic, professional, expert, novice, etc.). The user comments may be retrieved from various data sources (e.g., documents or links from a client system, a database system or other storage unit, network site or page presenting the item description, social networking sites, review network sites, manufacturer network sites, retail network sites, etc.). A hotel description may be of greater interest to the group of frequent visitors. The group receiving a lesser favor in the hotel description (e.g., occasional visitors) is determined using user reviews of the hotel produced by frequent visitors and occasional visitors. The group associated with a producer of a review may be identified based on known user profiles. The hotel features that indicate a higher level of hotel stay are determined from the user reviews, and objective (non-subjective) content from the user reviews associated with the occasional visitors and addressing the hotel features indicating a higher level of stay is extracted. A modified hotel description is generated by integrating the extracted content from user reviews of the occasional visitors into the original hotel description.

Present invention embodiments may dynamically update descriptive content for an item. For example, descriptive content may become stale over time as new user comments and/or new groups are produced. Accordingly, when new user comments for an item are produced or detected, corresponding descriptive content for the item may be updated based on features within the new user comments. Further, new user comments may be produced by individuals from one or more new groups, thereby enabling the descriptive content to be dynamically modified to be of interest to those new groups. The dynamic updating may be performed periodically, or in response to detecting new user comments or new groups. Thus, descriptive content may dynamically change to expand interest to an increasing quantity of individuals.

Present invention embodiments may further dynamically modify content during presentation or display. For example, when the entire descriptive content is unable to be presented at once (e.g., scrolling or other action may be needed to view additional portions of the descriptive content on a page or screen), portions of the descriptive content displayed may be of greater interest to one or more groups even though the descriptive content may have been balanced among groups. Present invention embodiments dynamically modify or reorder the descriptive content during scrolling or other actions to balance interested features among groups within the portions of the descriptive content suitably sized for presentation. For example, a portion may include an equal number of interested features among the groups. Alternatively, the quantity of interested features for each group within a portion may be within any desired amount or tolerance (e.g., the tolerance may in the range of one to five features, etc.).

Present invention embodiments produce significant business value for commercial content since including features of interest for different groups in an item description increases a likelihood of the item description being of interest to various individuals (e.g., or at least, increases their connection with the item which leads to a higher chance of conducting a transaction). Present invention embodiments further monitor and modify descriptive content using natural language processing to dynamically adapt the content in accordance with changes to individuals viewing the descriptive content.

An example computing environment 100 for use with present invention embodiments is illustrated in FIG. 1. Specifically, the computing environment includes one or more server systems 110, and one or more client or end-user systems 114. Server systems 110 and client systems 114 may be remote from each other and communicate over a network 112. The network may be implemented by any number of any suitable communications media (e.g., wide area network (WAN), local area network (LAN), Internet, Intranet, etc.). Alternatively, server systems 110 and client systems 114 may be local to each other, and communicate via any appropriate local communication medium (e.g., local area network (LAN), hardwire, wireless link, Intranet, etc.).

Client systems 114 enable users to interact with network sites and applications of server systems 110 to perform various actions (e.g., modify content, etc.). The client systems include an interface module or browser 120 to interact with network sites and applications of server systems 110. The client systems may provide one or more documents (e.g., files, links/URLs to the documents, etc.) containing content for an item. The content may include any type of content (e.g., text, strings, any other types of content (e.g., image, etc.) where words are able to be extracted, etc.) describing any type of item (e.g., advertisement, description, announcement, opinion, review, etc.). The server systems include a content module 116 to modify the content in order to include features of interest to various groups of individuals as described below. A database system 118, memory of the client and/or server systems, and/or other storage units may store various information for the analysis (e.g., content, natural language processing information, user comments, features of interest to groups of individuals, classifier information, groups of individuals and corresponding characteristics, etc.). The database system may be implemented by any conventional or other database or storage unit, may be local to or remote from server systems 110 and client systems 114, and may communicate via any appropriate communication medium (e.g., local area network (LAN), wide area network (WAN), Internet, hardwire, wireless link, Intranet, etc.). The client systems may present a graphical user (e.g., GUI, etc.) or other interface (e.g., command line prompts, menu screens, etc.) to solicit information from users pertaining to the desired documents and analysis, and may provide reports including analysis results (e.g., modified content, groups of individuals and corresponding characteristics, features of interest to the groups of individuals, etc.).

Server systems 110 and client systems 114 may be implemented by any conventional or other computer systems (e.g., FIG. 2 as described below) preferably equipped with a display or monitor, a base (e.g., including at least one hardware processor 115 (e.g., microprocessor, controller, central processing unit (CPU), etc.), one or more memories 135 and/or internal or external network interfaces or communications devices 125 (e.g., modem, network cards, etc.)), optional input devices (e.g., a keyboard, mouse or other input device), and any commercially available and custom software (e.g., server/communications software, content module 116, interface module 120, etc.).

Alternatively, one or more client systems 114 may analyze and modify content when operating as a stand-alone unit. In a stand-alone mode of operation, the client system stores or has access to the data, and further includes content module 116 to modify content in order to include features of interest to various groups of individuals. The graphical user (e.g., GUI, etc.) or other interface (e.g., command line prompts, menu screens, etc.) solicits information from a corresponding user pertaining to the desired documents and analysis, and may provide reports including analysis results.

Content and interface modules 116, 120 may include one or more modules or units to perform the various functions of present invention embodiments described below. The various modules (e.g., content module 116, interface module 120, etc.) may be implemented by any combination of any quantity of software and/or hardware modules or units, and may reside within memory 135 of the server and/or client systems for execution by processor 115.

Figure 2:
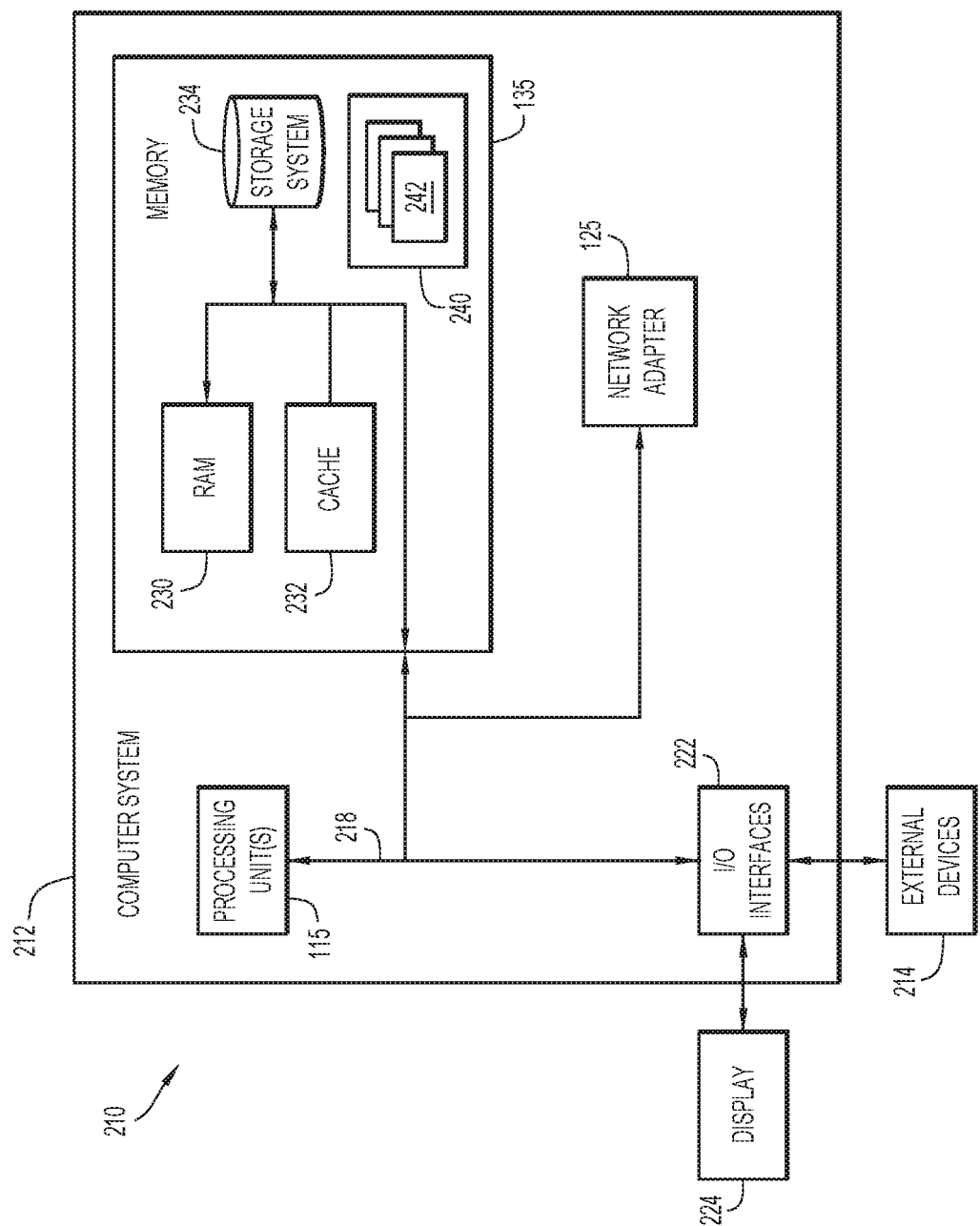
FIG. 2 is a block diagram of an example computing device according to an embodiment of the present invention.

Referring now to FIG. 2, a schematic of an example of a computing device 210 of computing environment 100 (e.g., implementing server system 110 and/or client system 114) is shown. The computing device is only one example of a suitable computing device for computing environment 100 and is not intended to suggest any limitation as to the scope of use or functionality of embodiments of the invention described herein. Regardless, computing device 210 is capable of being implemented and/or performing any of the functionality set forth herein.

In computing device 210, there is a computer system 212 which is operational with numerous other general purpose or special purpose computing system environments or configurations. Examples of computing systems, environments, and/or configurations that may be suitable for use with computer system 212 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 212 may be described in the general context of computer system executable instructions, such as program modules, being executed by a computer system. Generally, program modules may include routines, programs, objects, components, logic, data structures, and so on that perform particular tasks or implement particular abstract data types.

As shown in FIG. 2, computer system 212 is shown in the form of a computing device. The components of computer system 212 may include, but are not limited to, one or more processors or processing units 115, a system memory 135, and a bus 218 that couples various system components including system memory 135 to processor 115.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 212 typically includes a variety of computer system readable media. Such media may be any available media that is accessible by computer system 212, and it includes both volatile and non-volatile media, removable and non-removable media.

System memory 135 can include computer system readable media in the form of volatile memory, such as random access memory (RAM) 230 and/or cache memory 232. Computer system 212 may further include other removable/non-removable, volatile/non-volatile computer system storage media. By way of example only, storage system 234 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 135 may include at least one program product having a set (e.g., at least one) of program modules that are configured to carry out the functions of embodiments of the invention.

Program/utility 240, having a set (at least one) of program modules 242 (e.g., content module 116, interface module 120, etc.) may be stored in memory 135 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments of the invention as described herein.

Computer system 212 may also communicate with one or more external devices 214 such as a keyboard, a pointing device, a display 224, etc.; one or more devices that enable a user to interact with computer system 212; and/or any devices (e.g., network card, modem, etc.) that enable computer system 212 to communicate with one or more other computing devices. Such communication can occur via Input/Output (I/O) interfaces 222. Still yet, computer system 212 can communicate with one or more networks such as a local area network (LAN), a general wide area network (WAN), and/or a public network (e.g., the Internet) via network adapter 125. As depicted, network adapter 125 communicates with the other components of computer system 212 via bus 218. It should be understood that although not shown, other hardware and/or software components could be used in conjunction with computer system 212. Examples, include, but are not limited to: microcode, device drivers, redundant processing units, external disk drive arrays, RAID systems, tape drives, and data archival storage systems, etc.

Figure 3:
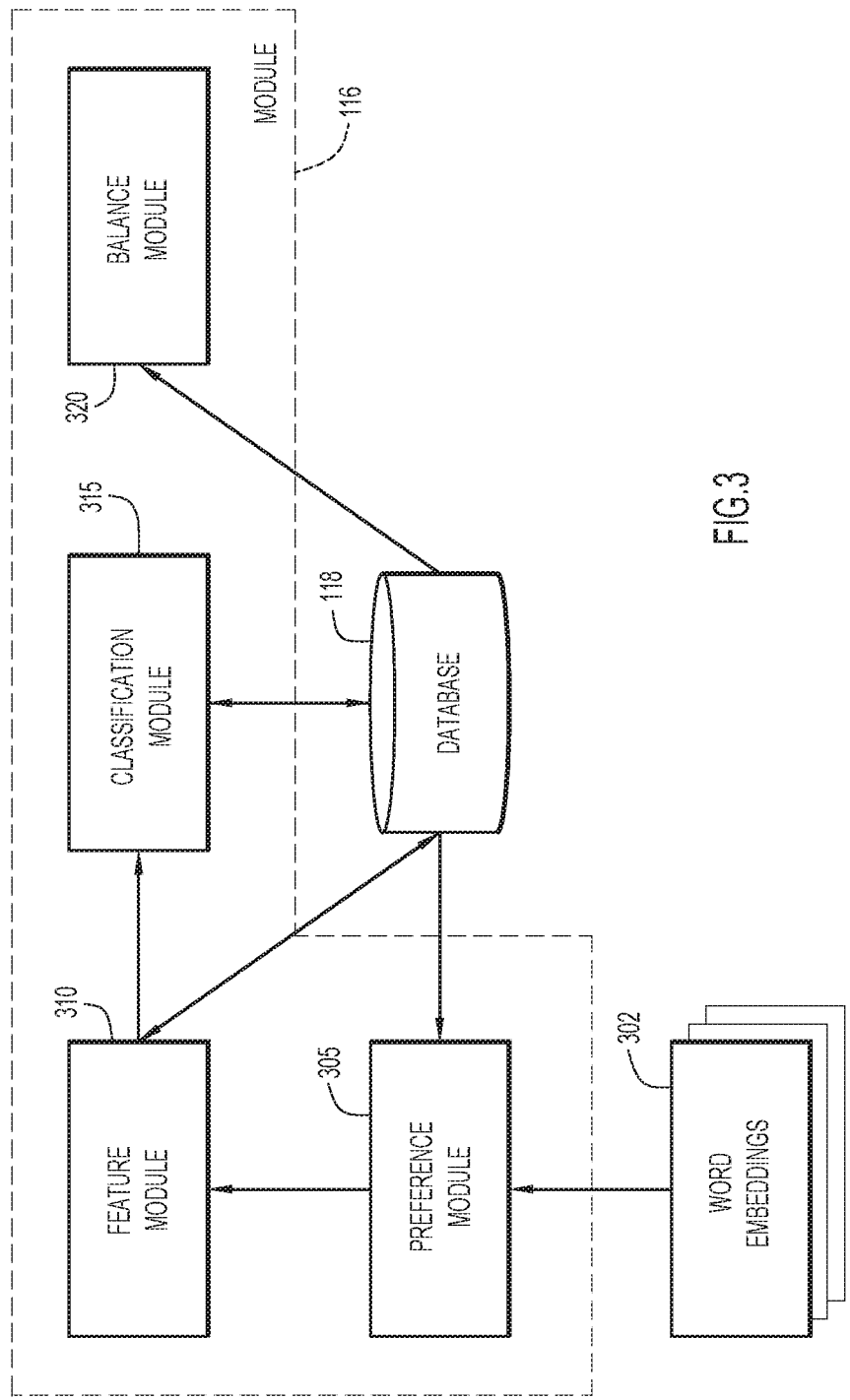
FIG. 3 is a block diagram illustrating a flow of the content module of FIG. 1 for modifying content to include features of interest to various groups according to an embodiment of the present invention.

Content module 116 modifies content to include features of interest to various groups of individuals. Referring to FIG. 3, content module 116 includes a preference module 305, a feature module 310, a classification module 315, and a balance module 320. Preference module 305 analyzes descriptive content for an item (e.g., product, service, announcement, opinion, etc.) and determines whether the descriptive content is of a greater interest to one or more groups of individuals. This may be accomplished based on existing word embeddings or vector representations 302 corresponding to words in the descriptive content as described below.

Feature module 310 determines features of interest to different groups of individuals based on user comments for the item produced by members of the different groups. The user comments may include any type of feedback (e.g., remarks, reviews or ratings of the item, gestures indicating approval or disapproval, etc.) from any type of user (e.g., individual, critic, professional, expert, novice, etc.).

Classification module 315 employs a machine learning classifier to classify or associate user comments with a particular group (e.g., determine that a user comment is produced by an experienced photographer, etc.). The classifier may be updated by training the classifier with the features determined by feature module 310.

Balance module 320 modifies the descriptive content to include the features of interest determined by feature module 310 for various groups of individuals for which the descriptive content is of lesser interest.

Figure 4:
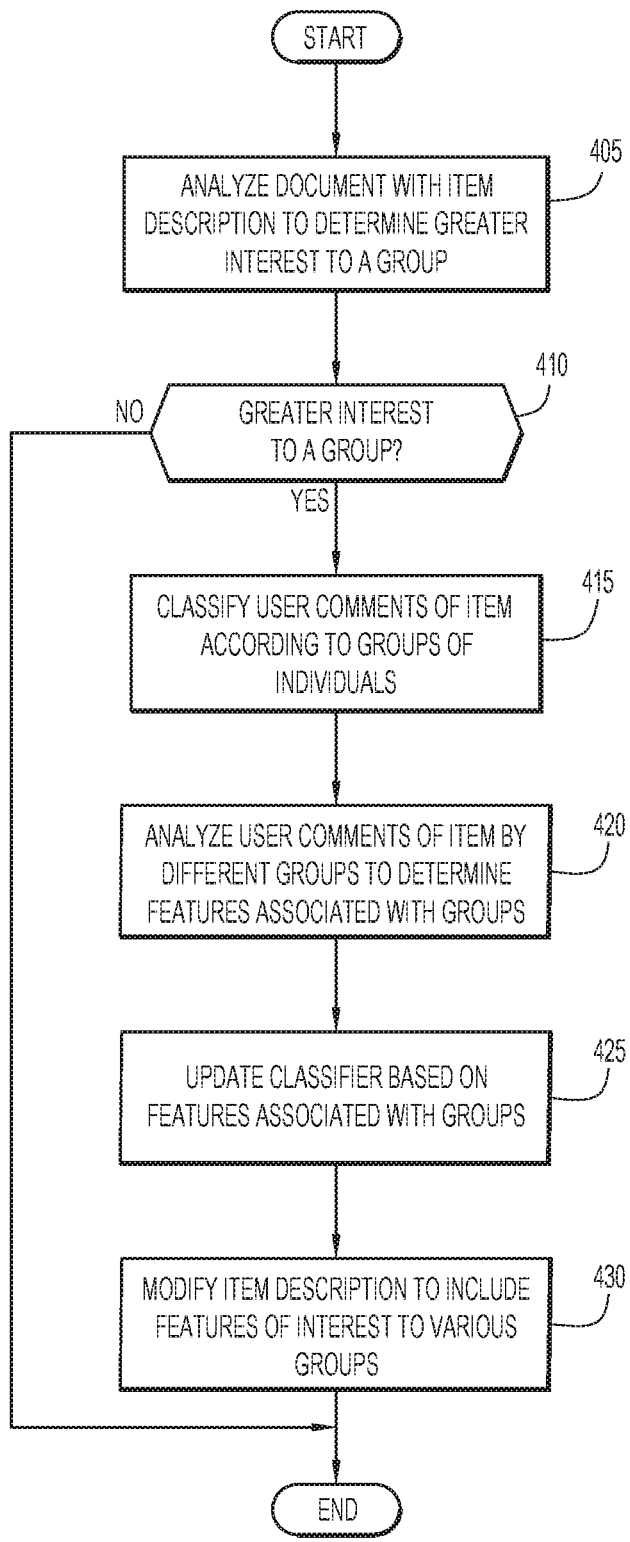
FIG. 4 is a procedural flowchart illustrating a manner of modifying content to include features of interest to various groups according to an embodiment of the present invention.

A manner of modifying content to include features of interest to various groups of individuals (e.g., via content module 116 and a server system 110 and/or client system 114) according to an embodiment of the present invention is illustrated in FIG. 4. Initially, preference module 305 receives descriptive content (e.g., text, etc.) for an item (e.g., product, service, announcement, opinion, etc.) within a document (e.g., web or network page, file, storage unit, etc.). Client system 114 may provide the document or a link to enable retrieval of the document. The preference module determines whether or not the descriptive content is of greater interest to one or more groups of individuals based on existing word embeddings or vector representations 302 corresponding to words in the descriptive content at operation 405. Each group may include one or more individuals or members having at least one characteristic in common (e.g., experience with an item, frequency of use of the item, level of knowledge about the item or general area, etc.). For example, the item may refer to a camera, and the groups of individuals may include a group with experienced photographers as members and another group with novice photographers as members. The word embeddings or vector representations may be produced using any conventional or other tools or techniques (e.g., GLOVE, WORD2VEC, etc.).

When the descriptive content is neutral (e.g., is not of greater interest to one or more groups of individuals) as determined at operation 410, the processing of the document with the descriptive content terminates. However, when the descriptive content is of greater interest to one or more groups of individuals as determined at operation 410, classification module 315 classifies or associates user comments for the item with corresponding groups of individuals (e.g., determine that a user comment is produced by an experienced photographer, etc.) at operation 415. This may be accomplished by identifying a user producing the user comment, and determining the group based on a comparison of information (e.g., hobbies, education, work or other experience, etc.) pertaining to the user from various sources (e.g., user profile or other information from social or other network sites, etc.) to characteristics of individuals in the groups.

Alternatively, classification module 315 may employ a machine learning classifier to classify or associate user comments with corresponding groups of individuals (e.g., determine that a comment is produced by an experienced photographer, etc.). The classifier may be employed individually, or in combination with the above classification based on user information. For example, the classifier may be employed when a corresponding group for a user comment is unable to be determined from user information. The classifier may correspond to the item, where one or more classifiers may be employed for accommodating different items.

Feature module 310 determines features of interest to different groups of individuals at operation 420 based on the user comments for the item produced by members of the different groups. For example, experienced photographers may focus on features of interest including lens quality, shutter speed settings, and aperture settings for a camera, while novice photographers may focus on features of interest including ease-of-use for the camera. These features may be identified in user comments and associated with the groups of individuals associated with those user comments.

Classification module 315 may update the classifier at operation 425 by training the classifier with the features determined by feature module 310. Balance module 320 modifies the descriptive content at operation 430 to include the features of interest determined by feature module 310 for other groups of individuals for which the descriptive content is of lesser interest. This enables the descriptive content to increase interest for those other groups.

In addition, the descriptive content for an item may be dynamically updated by an embodiment of the present invention. For example, when new user comments for an item are produced or detected, corresponding descriptive content for the item may be updated based on features within the new user comments in substantially the same manner described above. Further, new user comments may be produced by individuals from one or more new groups, thereby enabling the descriptive content to be dynamically modified to be of interest to those new groups in substantially the same manner described above. The dynamic updating may be performed periodically, or in response to detection of new user comments and/or new groups. Thus, an embodiment of the present invention provides dynamically changing descriptive content that expands interest to an increasing quantity of individuals.

Figure 5:
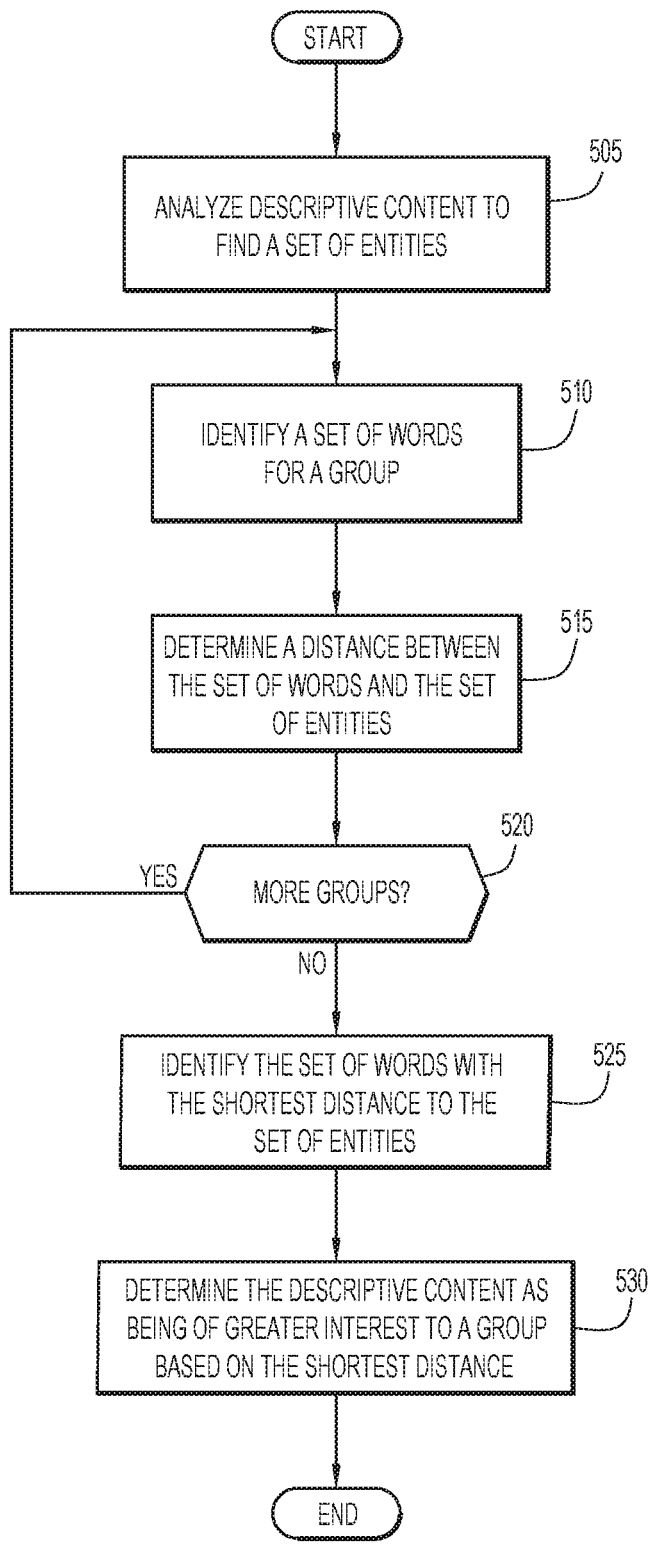
FIG. 5 is a procedural flowchart illustrating a manner of analyzing content to determine interest of the content towards one or more particular groups according to an embodiment of the present invention.

A manner of determining that the descriptive content is of greater interest to one or more groups of individuals (e.g., corresponding to operation 405 of FIG. 4) according to an embodiment of the present invention is illustrated in FIG. 5. Initially, the descriptive content for an item (e.g., product, service, announcement, opinion, etc.) is analyzed to identify a set of entities within the descriptive content at operation 505. The set of entities includes objects and corresponding attributes of the objects. The analysis may be accomplished using conventional or other natural language processing techniques (e.g., entity detection, relationship detection, annotators, dictionaries, etc.).

A set of words corresponding to a group of individuals is identified at operation 510. The set of words may be associated with the common characteristic of members in the group, and may be determined in various manners (e.g., predetermined list of words, information retrieved from a data source, etc.).

The distance between the identified set of words for the group and the set of entities is determined at operation 515. This may be accomplished by using word embeddings or vector representations of words 302 (FIG. 3). Basically, each word from the set of words and each entity (e.g., represented as a word) from the set of entities may be represented by a vector having numeric elements corresponding to a plurality of dimensions. Words with similar meanings have similar word embeddings or vector representations. The word embeddings are produced from machine learning techniques or models (e.g., neural network, etc.) based on an analysis of word usage in a collection of documents. The embeddings or vector representations may be pre-existing, and produced using any conventional or other tools or techniques (e.g., GLOVE, WORD2VEC, etc.).

By way of example, a set of word distances for the group may be determined between the identified set of words for the group and the set of entities. The set of word distances includes a word distance from each word of the identified set of words to each entity of the set of entities. The word distance may be determined from a distance between the vector representations of the words and the entities using any conventional or other techniques (e.g., Euclidean distance, cosine similarity, etc.). The word distances within the set may be combined in any fashion (e.g., summed, averaged, minimum value, maximum value, etc.) to determine the distance for the identified set of words to the set of entities.

When additional groups are present as determined at operation 520, a corresponding set of words for a next group is identified and a distance between the corresponding set of words for the next group and the set of entities is determined at operations 510 and 515 in substantially the same manner described above.

When no additional groups are present as determined at operation 520, the distances for the set of words identified for the groups (e.g., between the set of words associated with the groups and the set of entities) are evaluated, and the set of words closest (or having the shortest distance) to the set of entities is identified at operation 525. The descriptive content is determined at operation 530 to be of greater interest to the group associated with the closest set of words.

Alternatively, a plurality of the closest sets of words may be identified to indicate plural groups associated with those sets of words having a greater interest in the descriptive content. Further, when all or a majority of the sets of words have the same shortest distance to the set of entities, this typically indicates that the descriptive content is neutral (e.g., at operation 410 of FIG. 4) and modification of the descriptive content may not be performed. The majority may be based on any predefined percentage or amount (e.g., 50% or greater, 66% or greater, 75% or greater, 90% or greater, etc.).

Figure 6:
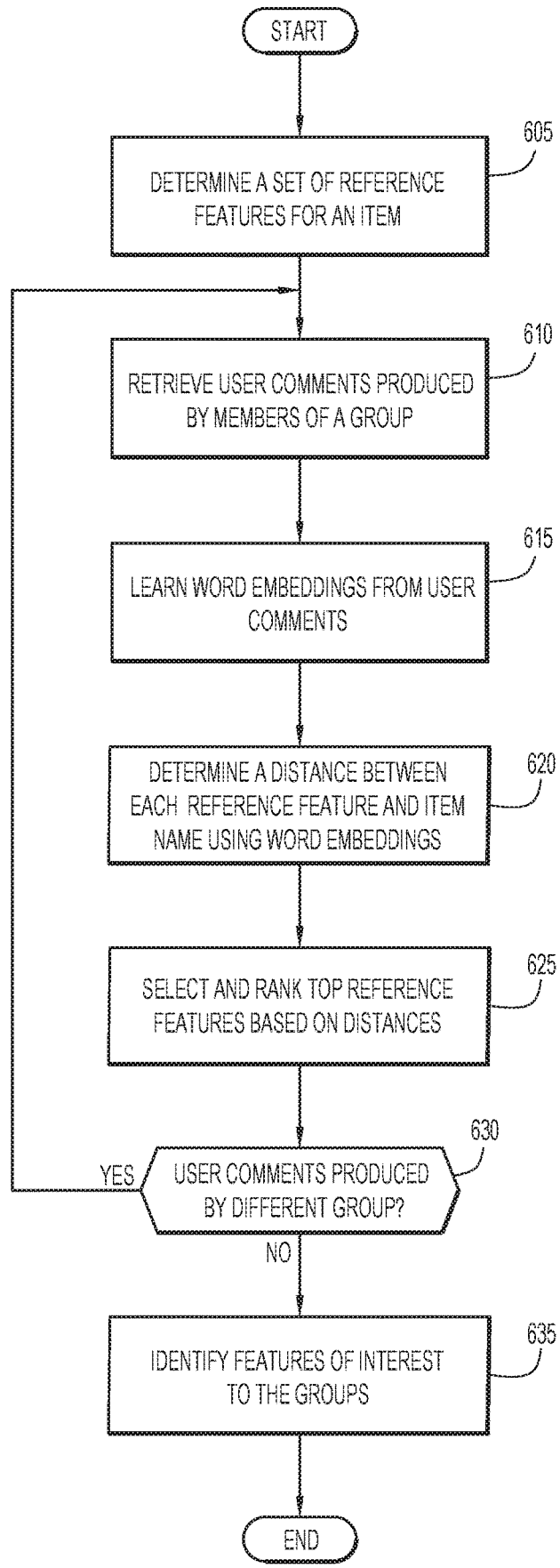
FIG. 6 is a procedural flowchart illustrating a manner of determining features of interest to different groups according to an embodiment of the present invention.

A manner of determining features of interest to different groups (e.g., corresponding to operation 420 of FIG. 4) from user comments for the item according to an embodiment of the present invention is illustrated in FIG. 6. Initially, a set of reference features (e.g., including entities and features, etc.) for the item is determined at operation 605. The reference features may be identified and retrieved from an existing ontology for the item indicating entities and features associated with the item, the descriptive content for the item, and/or other content corresponding to the item from various sources (e.g., network sites, documents, etc.).

Documents (e.g., web or network page, file, storage unit, etc.) containing user comments (e.g., text, images, graphics, etc.) produced by members of a group are retrieved at operation 610. The documents containing the user comments may be retrieved from various data sources (e.g., documents or links from client system 114, database system 118, network site or page presenting the item description, social networking sites, review network sites, manufacturer network sites, retail network sites, etc.). The user comments may include any type of feedback (e.g., remarks, reviews or ratings of the item, gestures indicating approval or disapproval, etc.) from any type of user (e.g., individual, critic, professional, expert, novice, etc.). The user comments may be posted by users on the web or network page near a description of the item. This may be accomplished by buttons or actuators of the web or network page. The documents may be processed in various manners to identify and extract user comments. For example, natural language processing may be employed to extract user comments. Further, image processing and/or optical character recognition may be employed to identify and extract text from graphics and/or images pertaining to user comments. In addition, tags within the documents (e.g., HTML or other tags) may be discovered to identify and extract the user comments.

The user comments are analyzed to learn word embeddings or vector representations from the words in the user comments at operation 615. The user comments may be pre-processed to remove or filter certain types of words (e.g., a, an, and, the, etc.) for learning the word embeddings. Basically, a word may be represented by a vector having numeric elements corresponding to a plurality of dimensions. Words with similar meanings have similar word embeddings or vector representations. The word embeddings are produced from machine learning techniques or models (e.g., neural network, etc.) based on an analysis of word usage in the documents containing the user comments.

Machine learning models from any conventional or other tools or techniques (e.g., GLOVE, WORD2VEC, etc.) may be used to learn the word embeddings from the user comments. For example, a multi-layer neural network may be trained with statistics of word usage (e.g., co-occurrence, etc.) within the user comments to learn the word embeddings. The neural network may be trained using a desired word, one or more adjacent words and/or context words, and the statistics to produce the word embedding or vector representation for the desired word. Once trained, the neural network may receive a word and produce the word embedding or vector representation for that word.

A feature distance is determined for each reference feature to the item (e.g., a name or other attribute of the item, etc.) using the learned word embeddings or vector representations at operation 620. By way of example, the feature distance between a reference feature and the item may be determined from a distance between the learned vector representations of the reference feature and the item (e.g., learned vector representation of the name or other attribute of the item) using any conventional or other techniques (e.g., Euclidean distance, cosine similarity, etc.).

A set of the reference features closest (or having the shortest distances) to the item is selected at operation 625. The set may include any quantity of reference features, and preferably includes in a range of five to ten reference features. The reference features within the set may be ranked based on the feature distances (e.g., reference features having shorter distances to the item are provided a higher ranking, etc.).

When documents having user comments from members of other groups are present as determined at operation 630, the user comments associated with the next group are retrieved and processed at operation 610 to determine a ranked set of reference features for that group in substantially the same manner described above. For example, the documents may be processed in various manners to identify and extract user comments associated with the next group in substantially the same manner described above. For example, natural language processing may be employed to extract user comments. Further, image processing and/or optical character recognition may be employed to identify and extract text from graphics and/or images pertaining to user comments. In addition, tags within the documents (e.g., HTML or other tags) may be discovered to identify and extract the user comments.

When no additional documents containing user comments from members of other groups are present as determined at operation 630, the resulting sets of ranked reference features for the groups are identified as the interested features (or features of interest) associated with those groups at operation 635.

Figure 7:
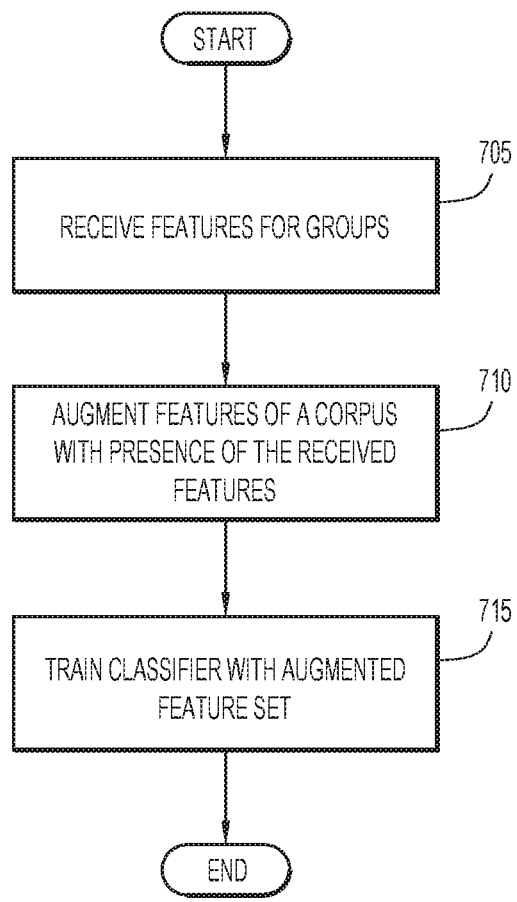
FIG. 7 is a procedural flowchart illustrating a manner of augmenting a classifier to classify a producer of a user comment into a group according to an embodiment of the present invention.

A manner of augmenting a classifier to classify a producer of a user comment into a group (e.g., corresponding to operation 425 of FIG. 4) according to an embodiment of the present invention is illustrated in FIG. 7.

Initially, classification module 315 may employ a machine learning classifier to classify or associate user comments for a corresponding item with a particular group (e.g., determine that a user comment is produced by an experienced photographer, etc.). The classifier may be implemented by any conventional or other machine learning models (e.g., random forest models, gradient or other boosting models, neural networks, etc.). The classifier is initially trained with a corpus of documents pertaining to the corresponding item (e.g., a set of user comments by members of each of the groups), known groups, and corresponding features of interest of the item to those known groups. Once trained, the classifier receives a document containing a user comment for the corresponding item, and predicts the group associated with the producer of the user comment (e.g., provides an output indicating the predicted group, such as a vector with a numerical indicator in the positon corresponding to the predicted group). One or more classifiers may be employed for accommodating different items, where each classifier may be trained for one or more corresponding items.

The interested features for the groups of individuals are retrieved at operation 705. The interested features are determined from user comments for the item as described above (e.g., FIG. 6). The existing features of interest used to train the classifier are augmented with the retrieved features of the groups at operation 710. This may be accomplished by augmenting the existing features of interest with the presence of the retrieved features indicated by Boolean values.

The corpus of documents and updated features are used to re-train the classifier at operation 715. The updated classifier may be used to classify a producer of a user comment into a corresponding group. Further, the updated classifier may be used to identify the group for a producer of a user comment whose group association is unknown or unable to be determined (e.g., from the initial classifier, from user information, etc.).

Figure 8:
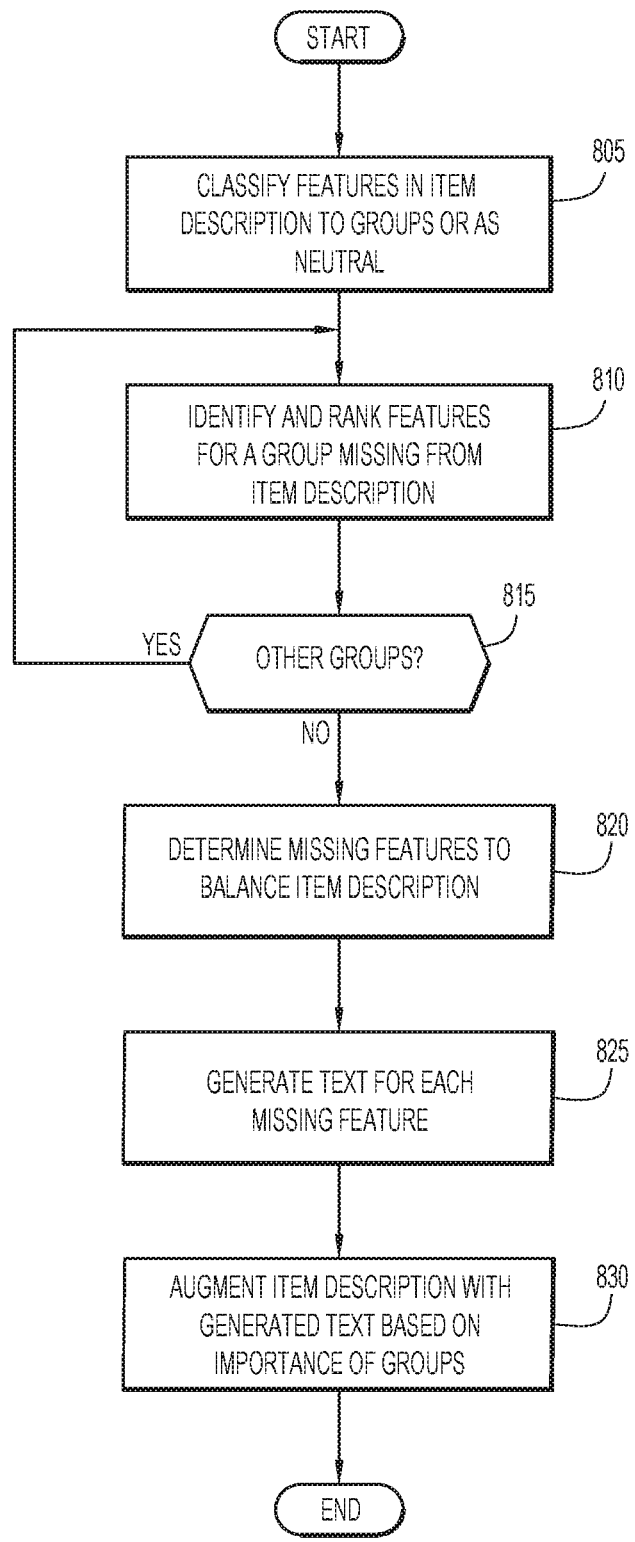
FIG. 8 is a procedural flowchart illustrating a manner of incorporating features of interest to various groups into content according to an embodiment of the present invention.

A manner of incorporating features of interest to various groups into the descriptive content (e.g., corresponding to operation 430 of FIG. 4) according to an embodiment of the present invention is illustrated FIG. 8. Initially, the descriptive content is analyzed to identify item content features and classify those features at operation 805. This may be accomplished by identifying the entities and features within the descriptive content for the item using natural language processing techniques (e.g., entity detection, relationship detection, annotators, dictionaries, etc.). An ontology associated with the item is selected from a plurality of existing domain ontologies. Each ontology includes nodes representing entities and features for different items of a corresponding subject matter domain. The nodes of the selected ontology are compared to the entities and features identified within the descriptive content. The item content features include the entities and features identified in the descriptive content that match or partially match the nodes from the selected ontology.

The item content features identified in the descriptive content are compared to the interested features associated with the different groups of individuals (ascertained from user comments as described above) to associate or classify the item content features into those groups (e.g., experienced photographer, novice photographer, etc.). For example, an item content feature may be associated with a group of individuals based on a match or partial match with one or more interested features associated with the group. When an item content feature is unable to be assigned to a group (e.g., no matches or partial matches exist), the item content feature is considered neutral.

The item content features associated with a group of individuals are compared to the interested features for the group (ascertained from the user comments as described above) to identify interested features for the group missing or absent from the descriptive content at operation 810. In other words, the missing features are those interested features that are considered important for members of the group as determined from the user comments, but are not present in the descriptive content for the item. The missing features are ranked based on the feature distances of those features to the item determined as described above (e.g., missing features having shorter distances to the item are provided a higher ranking, etc.).

When additional groups are present as determined at operation 815, missing features for a next group are identified at operation 810 in substantially the same manner described above.

When no additional groups are present as determined at operation 815, the missing features of each group are evaluated at operation 820 to determine the missing features of each group to incorporate in the descriptive content in order to balance the interested features within the descriptive content among the groups. For example, this may be accomplished by determining the amount of interested features of each group present in the descriptive content, and incorporating a sufficient quantity of missing features from the groups with a lesser amount of interested features to provide an equal number of interested features within the descriptive content for each group. Alternatively, the quantity of interested features within the descriptive content for each group may be within any desired amount or tolerance (e.g., the tolerance may in the range of one to five features, etc.). This effectively creates an offsetting balance-distribution for the groups (e.g., interested features are increased within the descriptive content for groups for which the descriptive content is of lesser interest, etc.), thereby compensating for the initial determination that the descriptive content is of a greater interest to one or more groups (e.g., as described above for FIGS. 4 and 5).

Once the missing features to incorporate into the descriptive content are determined for each group, text is generated for each of these missing features at operation 830. The text may be in the form of natural language sentences generated from a feature set for a missing feature of a group to be incorporated into the descriptive content. The feature set may include, be derived from, or contain attributes of, the missing and/or other interested features for the group.

For example, a sentence for a missing feature of a group to be incorporated into the descriptive content may be generated by identifying sentences within user comments by members of the group that mention features of the feature set. When plural sentences are identified that mention features of the feature set, the sentences are ranked based on an amount of features of the feature set that is present (and/or an amount of features of the feature set or interested features that are absent). The highest ranking sentences are selected and extracted from the user comments for incorporation into the descriptive content for the missing feature. The quantity of highest ranking sentences to be incorporated into the descriptive content may be any desired value, and is preferably selected to maintain a reasonable length for the descriptive content (e.g., fit on a single page, etc.).

By way of further example, a sentence may be generated for a missing feature of a group to be incorporated into the descriptive content by finding sentences containing the feature set within an external corpus for descriptive content of the item (e.g., a knowledge sharing portal, etc.). These sentences may be selected for incorporation into the descriptive content for the missing feature. The quantity of sentences to be incorporated into the descriptive content may be any desired value, and is preferably selected to maintain a reasonable length for the descriptive content (e.g., fit on a single page, etc.).

As another example, a sentence may be generated for a missing feature of a group to be incorporated into the descriptive content by using a natural language generation model to generate sentences for the feature set. User comments by members of the group are utilized to produce a machine learning natural language generation model (e.g., to learn sentence patterns, etc.). The natural language generation model may be used to generate sentences for the feature set. The quantity of sentences to be incorporated into the descriptive content may be any desired value, and is preferably selected to maintain a reasonable length for the descriptive content (e.g., fit on a single page, etc.).

In addition, the selected sentences may be processed by conventional or other natural language processing techniques employing sentiment analysis to determine a sentiment of each sentence. Sentences providing a positive sentiment toward the item are preferably selected for insertion into the descriptive content (since the sentences with positive sentiment may be of greater interest to the corresponding groups).

Once the sentences for each of the missing features of the groups are generated, the descriptive content for the item is modified using the generated sentences at operation 835. This may be accomplished by evaluating the descriptive content to determine an importance of interested features of groups within the descriptive content. For example, the importance may be indicated by an order that interested features of groups are presented within the descriptive content (e.g., interested features of a group may be presented first, while interested features of other groups are presented later).

The sentences associated with the missing features of groups are appended to the descriptive content in order of importance, where sentences of missing features of groups of lesser importance are appended to the descriptive content prior to sentences of missing features of groups of greater importance.

Alternatively, the interested features within the descriptive content may be balanced by removing interested features of groups for which the descriptive content has a greater amount of interested features. A sufficient quantity of missing features from the groups with a greater amount of interested features may be removed to provide an equal number of interested features within the descriptive content for each group. This may be accomplished by determining the amount of interested features of each group present in the descriptive content, and removing a sufficient quantity of missing features from the groups with a greater amount of interested features to provide an equal number of interested features within the descriptive content for each group. Alternatively, the quantity of interested features within the descriptive content for each group may be within any desired amount or tolerance (e.g., the tolerance may in the range of one to five features, etc.).

The interested features may be removed based on the corresponding feature distances to the item (e.g., the interested features with the greatest distances from the item may be removed prior to other interested features, thereby leaving the interested features considered to be of greater importance within the descriptive content). The sentences within the descriptive content corresponding to (or containing one or more of) the removed features are removed from the descriptive content.

For example, when the groups each have all of their corresponding interested features present in the descriptive content, interested features of the groups having a greater amount of interested features (and the corresponding sentences or content) may be removed to balance the interested features among the groups (e.g., since, in this case, there are no missing features of the groups to incorporate). Alternatively, when there are no missing features for the groups, the interested features of the groups with greater feature distances (e.g., excluded based on the ranking and selection of the reference features as described above for FIG. 6) may be utilized to determine missing features for the groups to incorporate into the descriptive content as described above.

In addition, when the entire descriptive content is unable to be presented at once (e.g., scrolling or other action may be needed to view additional portions on a page or screen), the descriptive content is dynamically modified or reordered during scrolling or other actions to balance interested features among groups within the portions of the descriptive content suitably sized for presentation. For example, a portion may include an equal number of interested features among the groups. Alternatively, the quantity of interested features for each group within a portion may be within any desired amount or tolerance (e.g., the tolerance may in the range of one to five features, etc.).

It will be appreciated that the embodiments described above and illustrated in the drawings represent only a few of the many ways of implementing embodiments for content modification using natural language processing to include features of interest to various groups.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., interface module or browser 120, communications software, server software, content module 116, etc.). These systems may include any types of monitors and input devices (e.g., keyboard, mouse, voice recognition, etc.) to enter and/or view information.

It is to be understood that the software (e.g., content module 116, interface module 120, preference module 305, feature module 310, classification module 315, balance module 320, etc.) of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments (e.g., content module 116, interface module 120, preference module 305, feature module 310, classification module 315, balance module 320, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., content, natural language processing information, user comments, features of interest for groups of individuals, classifier information, groups of individuals and corresponding characteristics, etc.). The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The present invention embodiments may employ any number of any type of user interface (e.g., Graphical User Interface (GUI), command-line, prompt, etc.) for obtaining or providing information (e.g., files, links/URLs to documents, modified content, groups of individuals and corresponding characteristics, features of interest to the groups of individuals, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

A report may include any information arranged in any fashion, and may be configurable based on rules or other criteria to provide desired information to a user (e.g., modified content, groups of individuals and corresponding characteristics, features of interest to the groups of individuals, etc.).

The present invention embodiments are not limited to the specific tasks or algorithms described above, but may be utilized for any type of content (e.g., text, strings, any other types of content where words are able to be extracted, etc.) describing any type of item (e.g., advertisement, description, announcement, opinion, review, etc.). The user comments may include any type of feedback (e.g., remarks, reviews or ratings of the item, gestures indicating approval or disapproval, etc.) from any type of user (e.g., individual, critic, professional, expert, novice, etc.). The descriptive content may include any type of content (e.g., text, strings, any other types of content (e.g., image, etc.) where words are able to be extracted, etc.) describing any type of item (e.g., advertisement, description, announcement, opinion, review, etc.). The content and user comments may be contained with any desired type of document (e.g., web or network page, file or other storage unit or memory location, etc.)

The word embeddings or vector representations may include any quantity of elements and be produced by any conventional or other techniques. The distance between word embeddings may be determined using any conventional or other techniques (e.g., Euclidean distance, cosine similarity, etc.). The features of interest to groups may be selected and/or ranked based on any criteria (e.g., shortest distance, longest distance, etc.). Groups may be formed based on any quantity or type of characteristics of individuals (e.g., experience with an item, frequency of use of the item, level of knowledge about the item or general area, etc.). The various features (e.g., reference features, interested features, item content features, etc.) may include any quantity of entities and/or features. The entities may include any desired objects associated with the item, while the features may include corresponding attributes or characteristics of the item and/or objects. For example, an item in the form of a camera may be associated with an entity of a shutter and a feature or attribute indicating the shutter speed range, etc.

Any quantity of features may be added to or removed from the descriptive content to balance the descriptive content. Any desired strategy may be employed for the balancing (e.g., equal number of features, a quantity of features within a tolerance or range, etc.). Any quantity of sentences corresponding to features may be added to the descriptive content at any location based on any desired criteria (e.g., importance, context, longest or shortest distances, etc.). Further, any quantity of sentences corresponding to features may be removed from the descriptive content at any location based on any desired criteria (e.g., importance, context, etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of modifying content associated with an item comprising:

determining, via a processor, features of interest of the item to a plurality of different groups based on user comments produced by members of the plurality of different groups, wherein the members within each group have a common characteristic;

identifying, via the processor, the features of interest to each group within the content associated with the item; and modifying, via the processor, the content associated with the item by balancing the features of interest to the plurality of different groups within the content associated with the item, wherein the balancing includes:

scrolling the content associated with the item on a display, wherein a size of the content associated with the item exceeds a presentation size for the display; and adjusting a quantity of the features of interest to one or more of the plurality of different groups in a scrolled portion of the content associated with the item presented on the display, wherein the adjusted scrolled portion of the content associated with the item includes a quantity of the features of interest to each group that is within a tolerance of a predetermined number of features from quantities of features of interest for others of the plurality of different groups.

2. The method of claim 1, further comprising:

determining, via the processor, that the content associated with the item is of greater interest to one of the plurality of different groups based on a distance between entities within the content associated with the item and sets of words describing the plurality of different groups.

3. The method of claim 1, wherein determining the features of interest of the item to the plurality of different groups comprises:

determining a set of reference features for the item;

learning vector representations of words using the user comments produced by one or more members of a group; and selecting one or more reference features as the features of interest to the group based on distances between the learned vector representation corresponding to each reference feature within the set of reference features and the learned vector representation corresponding to the item.

4. The method of claim 3, wherein selecting one or more reference features as the features of interest to the group comprises:

ranking the reference features based on the distances, wherein the reference features with a shorter distance to the item are assigned a higher ranking; and selecting one or more of the ranked features in order of the ranking as the features of interest to the group.

5. The method of claim 1, wherein determining the features of interest of the item to the plurality of different groups comprises:
- classifying the user comments into the plurality of different groups using a machine learning classifier; and
- re-training the machine learning classifier based on the features of interest to the plurality of different groups.

6. The method of claim 1, wherein modifying the content associated with the item comprises:
- determining the features of interest to the plurality of different groups absent from the content associated with the item; and
- incorporating one or more of the absent features of the plurality of different groups into the content associated with the item, wherein the quantity of the features of interest to each group is balanced within the content associated with the item, and wherein incorporating the one or more absent features of the plurality of different groups comprises:
  - generating one or more sentences for each of the one or more absent features of the plurality of different groups; and
  - inserting the one or more sentences into the content associated with the item.

7. The method of claim 1, wherein the predetermined number is in a range of one to five.

8. A system of modifying content associated with an item comprising:
- at least one processor configured to:
  - determine features of interest of the item to a plurality of different groups based on user comments produced by members of the plurality of different groups, wherein the members within each group have a common characteristic;
  - identify the features of interest to each group within the content associated with the item; and
  - modify the content associated with the item by balancing the features of interest to the plurality of different groups within the content associated with the item, wherein the balancing includes:
    - scrolling the content associated with the item on a display, wherein a size of the content associated with the item exceeds a presentation size for the display; and
    - adjusting a quantity of the features of interest to one or more of the plurality of different groups in a scrolled portion of the content associated with the item presented on the display, wherein the adjusted scrolled portion of the content associated with the item includes a quantity of the features of interest to each group that is within a tolerance of a predetermined number of features from quantities of features of interest for others of the plurality of different groups.

9. The system of claim 8, wherein the at least one processor is further configured to:
- determine that the content associated with the item is of greater interest to one of the plurality of different groups based on a distance between entities within the content associated with the item and sets of words describing the plurality of different groups.

10. The system of claim 8, wherein determining the features of interest of the item to the plurality of different groups comprises:
- determining a set of reference features for the item;
- learning vector representations of words using the user comments produced by one or more members of a group; and
- selecting one or more reference features as the features of interest to the group based on distances between the learned vector representation corresponding to each reference feature within the set of reference features and the learned vector representation corresponding to the item.

11. The system of claim 10, wherein selecting one or more reference features as the features of interest to the group comprises:
- ranking the reference features based on the distances, wherein the reference features with a shorter distance to the item are assigned a higher ranking; and
- selecting one or more of the ranked features in order of the ranking as the features of interest to the group.

12. The system of claim 8, wherein determining the features of interest of the item to the plurality of different groups comprises:
- classifying the user comments into the plurality of different groups using a machine learning classifier; and
- re-training the machine learning classifier based on the features of interest to the plurality of different groups.

13. The system of claim 8, wherein modifying the content associated with the item comprises:
- determining the features of interest to the plurality of different groups absent from the content associated with the item; and
- incorporating one or more of the absent features of the plurality of different groups into the content associated with the item, wherein the quantity of the features of interest to each group is balanced within the content associated with the item, wherein incorporating the one or more absent features of the plurality of different groups comprises:
  - generating one or more sentences for each of the one or more absent features of the plurality of different groups; and
  - inserting the one or more sentences into the content associated with the item.

14. A computer program product for modifying content associated with an item, the computer program product comprising one or more computer readable storage media having program instructions collectively stored on the one or more computer readable storage media, the program instructions executable by a processor to cause the processor to:
- determine features of interest of the item to a plurality of different groups based on user comments produced by members of the plurality of different groups, wherein the members within each group have a common characteristic;
- identify the features of interest to each group within the content associated with the item; and
- modify the content associated with the item by balancing the features of interest to the plurality of different groups within the content associated with the item, wherein the balancing includes:
  - scrolling the content associated with the item on a display, wherein a size of the content associated with the item exceeds a presentation size for the display;
  - adjusting a quantity of the features of interest to one or more of the plurality of different groups in a scrolled portion of the content associated with the item presented on the display, wherein the adjusted scrolled portion of the content associated with the item includes a quantity of the features of interest to each group that is within a tolerance of a predetermined number of features from quantities of features of interest for others of the plurality of different groups.

15. The computer program product of claim 14, wherein the program instructions further cause the processor to:
determine that the content associated with the item is of greater interest to one of the plurality of different groups based on a distance between entities within the content associated with the item and sets of words describing the plurality of different groups.

16. The computer program product of claim 14, wherein determining the features of interest of the item to the plurality of different groups comprises:
determining a set of reference features for the item;
learning vector representations of words using the user comments produced by one or more members of a group; and
selecting one or more reference features as the features of interest to the group based on distances between the learned vector representation corresponding to each reference feature within the set of reference features and the learned vector representation corresponding to the item.

17. The computer program product of claim 16, wherein selecting one or more reference features as the features of interest to the group comprises:
ranking the reference features based on the distances, wherein the reference features with a shorter distance to the item are assigned a higher ranking; and
selecting one or more of the ranked features in order of the ranking as the features of interest to the group.

18. The computer program product of claim 14, wherein determining the features of interest of the item to the plurality of different groups comprises:
classifying the user comments into the plurality of different groups using a machine learning classifier; and
re-training the machine learning classifier based on the features of interest to the plurality of different groups.

19. The computer program product of claim 14, wherein modifying the content associated with the item comprises:
determining the features of interest to the plurality of different groups absent from the content associated with the item; and
incorporating one or more of the absent features of the plurality of different groups into the content associated with the item, wherein the quantity of the features of interest to each group is balanced within the content associated with the item.

20. The computer program product of claim 19, wherein incorporating the one or more absent features of the plurality of different groups comprises:
generating one or more sentences for each of the one or more absent features of the plurality of different groups; and
inserting the one or more sentences into the content associated with the item.

* * * * *